United States Patent
Gilkes

(10) Patent No.: US 7,142,156 B2
(45) Date of Patent: Nov. 28, 2006

(54) SYSTEM AND METHOD FOR PROVIDING TIME TO A SATELLITE POSITIONING SYSTEM (SPS) RECEIVER FROM A NETWORKED TIME SERVER

(75) Inventor: Alan M. Gilkes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/845,446

(22) Filed: May 13, 2004

(65) Prior Publication Data

US 2005/0078032 A1 Apr. 14, 2005

Related U.S. Application Data

(63) Continuation of application No. 10/324,674, filed on Dec. 19, 2002, now Pat. No. 6,768,452.

(51) Int. Cl.
*H04B 7/185* (2006.01)

(52) U.S. Cl. .................. 342/357.15; 342/352

(58) Field of Classification Search ............... 342/352, 342/357.06, 357.15; 701/207, 213, 215
See application file for complete search history.

(56) References Cited

U.S. PATENT DOCUMENTS

| | | | |
|---|---|---|---|
| 5,663,734 A | 9/1997 | Krasner | |
| 6,002,363 A | 12/1999 | Krasner | |
| 6,104,338 A | 8/2000 | Krasner | |
| 6,111,540 A | 8/2000 | Krasner | |
| 6,133,874 A * | 10/2000 | Krasner | 342/357.15 |
| 6,208,290 B1 | 3/2001 | Krasner | |
| 6,377,209 B1 | 4/2002 | Krasner | |
| 6,433,734 B1 * | 8/2002 | Krasner | 342/357.09 |
| 2003/0107513 A1 * | 6/2003 | Abraham et al. | 342/357.1 |
| 2003/0137450 A1 * | 7/2003 | Jandrell | 342/357.12 |
| 2003/0151547 A1 | 8/2003 | Mauro et al. | |
| 2004/0047307 A1 * | 3/2004 | Yoon et al. | 370/324 |
| 2005/0080561 A1 * | 4/2005 | Abraham et al. | 701/213 |

OTHER PUBLICATIONS

"Internet Time Synchronization: the Network Time Protocol 1,2,3", David L. Mills, reprinted from IEEE Trans. Communications 39, 10, University of Deleware, Electrical Engineering Department, Newark, DE 19716, Oct. 1991, pp. 1-14.

* cited by examiner

*Primary Examiner*—Dao L. Phan
(74) *Attorney, Agent, or Firm*—Ronald O. Neerings; Wade James Brady, III; Frederick J. Telecky, Jr.

(57) ABSTRACT

System and method for enabling signal acquisition in a satellite positioning system (SPS) when signals from SPS satellites are attenuated by the operating environment of a SPS receiver. A preferred embodiment comprises a communications server (for example, communications server 220) coupled to a SPS receiver (for example, SPS receiver 210) at one end and a time server (for example, time server 225) by a public network (for example, the Internet 230). Preferably, the communications server 220 is coupled to the Internet 230 via a wireless network to facilitate maximum mobility and flexibility. The communications server 220 queries the time server 225 for the current time and then provides the current time to the SPS receiver 210. The SPS receiver 210 makes use of the current time to assist it in signal acquisition.

24 Claims, 7 Drawing Sheets

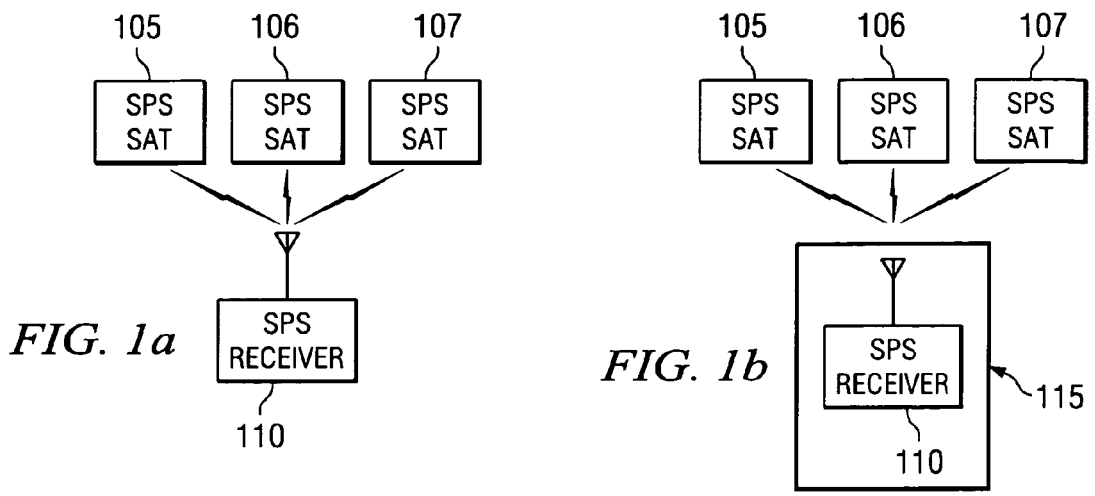
FIG. 1a
FIG. 1b
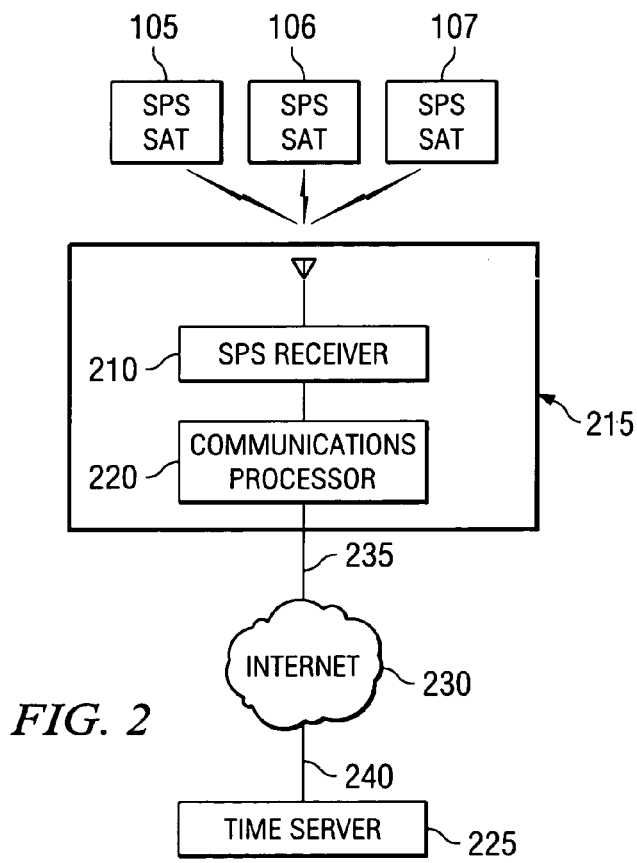
FIG. 2
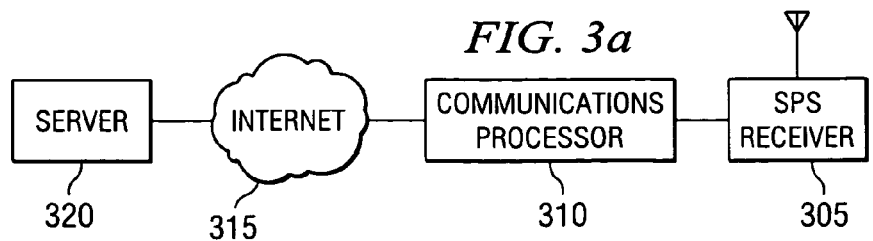
FIG. 3a

SYSTEM AND METHOD FOR PROVIDING TIME TO A SATELLITE POSITIONING SYSTEM (SPS) RECEIVER FROM A NETWORKED TIME SERVER

This application is a Continuation of application Ser. No. 10/324,674, filed on Dec. 19, 2002, now U.S. Pat. No. 6,768,452.

TECHNICAL FIELD

The present invention relates generally to a system and method for satellite positioning systems, and more particularly to a system and method for providing time to a satellite positioning system receiver to assist it in satellite acquisition.

BACKGROUND

Generally, satellite positioning systems (SPS), (for example, Navstar or Global Positioning System (GPS) is a widely used SPS system), provide an invaluable service that has perhaps exceeded the imagination of the designers of the systems. For example, SPS systems are used in military applications (such as providing targeting information for smart bombs, navigation guidance for vehicles and foot soldiers, etc.), commercial applications (such as tracking delivery trucks, measuring the performance of vehicles, providing position location to a person on foot or in a vehicle, etc.), and medical and scientific applications (such as assisting in the location of persons in need of assistance, tracking animal migrations, etc.).

While SPS systems have become widely used today, there remains a major problem that hinders their use in certain situations. Since the satellites are in high-earth orbit (for example, the satellites in the GPS system orbit the Earth at approximately 11,000 nautical miles), the signals that are transmitted by the satellites are usually very weak by the time they reach a SPS receiver. Because the satellites must provide their own power (typically through the use of solar panels), the transmit signal strength cannot simply be increased, since doing so may consume more power than the solar panels are able to provide. Due to the relatively low transmit signal power, SPS signals are attenuated by thick foliage, buildings, tunnels, etc. to a point where the SPS signals fall below a minimum signal power threshold and becomes difficult (if not impossible) for the SPS receiver to detect.

When a SPS receiver is first turned on, it must be able to receive the transmitted signals from a certain number of SPS satellites (for example, in the GPS system, the GPS receiver should be able to receive the transmitted signal from at least three or four GPS satellites) before it can determine its position and the current time. Each satellite in the SPS system transmits a unique signal that can be used by the SPS receiver (in conjunction with signals from other SPS satellites) to calculate the SPS receiver's position and time. One of the most vital pieces of information that is transmitted in the SPS signal is a highly accurate timing signal. Along with the timing signal, other information (commonly referred to as ephemeris data) is transmitted by a SPS satellite. The timing signals transmitted by the SPS satellites are usually referenced to a particular time, for example, Greenwich Mean Time. The differences between the various timing signals received by the SPS receiver and its own internal clock are then used to calculate the position of the SPS receiver and the current time.

The low transmit signal power, when compounded with the natural attenuation (signal strength being inversely proportional to distance) of the transmit signals, may prevent SPS receivers from being able to acquire the signal that is transmitted from the SPS satellites (or from a sufficient number of SPS satellites). A low transmit signal power that is further attenuated by objects in the operating environment of a SPS receiver can slow down the acquisition process to the order of several minutes (or more) or it may prevent the acquisition from occurring altogether.

It has been noted that if a SPS receiver can be provided with an accurate timing reference (along with ephemeris data) through a source other than the actual signals transmitted by the SPS satellites, the acquisition process can be accelerated (or completed if it was previously unable to do so). Moreover, the more accurate the timing reference that is provided through an alternate source, the easier the acquisition process becomes.

A widely available communications network that can itself be used to provide an accurate timing reference (along with ephemeris data) is the cellular telephone network. Certain types of cellular telephone networks have highly accurate built-in clocks. For cellular telephone networks without built-in clocks, such clocks may be added at the cell-sites (base stations). One proposed solution for helping the SPS receiver achieve faster satellite acquisition makes use of an enhanced SPS receiver with a built-in cellular telephone network interface. The enhanced SPS receiver can then communicate with the cellular telephone network and obtain an accurate timing reference from a clock built into the cellular telephone network.

One disadvantage of the prior art is that although there exists a large networks of cellular telephone systems, only a relatively small number of them are equipped to provide the accurate timing reference. For the majority of the remaining cellular telephone systems, an accurate timing reference needs to be installed at high cost.

A second disadvantage of the prior art is that while large networks of cellular telephone systems exist, there are large parts of the world (rural and under-developed regions) where there is no cellular telephone coverage. Therefore, in areas with no cellular telephone coverage, the SPS receivers may still trouble acquiring the signals transmitted by the SPS satellites.

SUMMARY OF THE INVENTION

These and other problems are generally solved or circumvented, and technical advantages are generally achieved, by preferred embodiments of the present invention which provide a system and method for assisting a satellite positioning system (SPS) receiver in acquiring the transmitted signal from SPS satellites by providing the SPS receiver with accurate timing information via the use of a communications link (preferably wireless) and readily available time servers. Preferred embodiments are particularly effective when signals from the SPS satellites are attenuated.

In accordance with a preferred embodiment of the present invention, a method for providing time information comprising sending a query to a time server via a first communications network, determining a time-of-day from a response from the time server, adjusting a clock if the time-of-day differs from a time maintained by the clock, and providing the time information to a satellite positioning system (SPS) receiver via a first communications link, wherein the communications link is different from a second communications link that is used by satellites in the SPS to transmit information to the SPS receiver.

In accordance with another preferred embodiment of the present invention, a method for facilitating signal acquisition in a satellite positioning system (SPS) comprising sending a periodic query with a first period to a time server via a communications network, determining a time-of-day from a response from the time server, adjusting a clock if the time-of-day differs from a time maintained by the clock, and providing a time information based on the time maintained in the clock periodically to a SPS receiver with periodicity equal to a second period via a first communications link, wherein the first communications link is different from a second communications link that is used by satellites in the SPS to transmit information to the SPS receiver.

In accordance with another preferred embodiment of the present invention, a system for aiding signal acquisition in a satellite positioning system (SPS) comprising a SPS receiver, the SPS receiver containing circuitry to receive transmissions from a plurality of SPS satellites and compute its current position and a current time from the received transmissions a communications processor coupled to the SPS receiver, the communications processor containing circuitry to obtain time information from an external source and to provide the time information to the SPS receiver, a first communications network coupled to the communications processor, and a time server coupled to the first communications network, the time server containing circuitry to maintain accurate time and to response to time queries.

In accordance with another preferred embodiment of the present invention, a position measuring device comprising a satellite positioning system (SPS) receiver comprising an analog processing unit containing circuitry to filter and amplify an analog SPS signal received via an antenna, a digital processing unit coupled to the analog processing unit, the digital processing unit containing circuitry to perform signal acquisition, correlation, and decode, a communications processor comprising a pulse and message generator (PMG) unit containing circuitry to produce a timing beacon and a timing message, a real-time clock coupled to the PMG unit, the real-time clock containing circuitry to keep track of time and to generate signals to indicate timing events, and a network client coupled to the real-time clock, the network client containing circuitry to receive timing information from a time server coupled to the communications processor via a network and to provide time adjustments to the real-time clock.

In accordance with another preferred embodiment of the present invention, a communications processor comprising a pulse and message generator (PMG) containing circuitry to produce a timing beacon and a timing message for use by a satellite positioning system receiver, a real-time clock coupled to the PMG, the real-time clock containing circuitry to track time and to generate signals to indicate timing events to the PMG, and a network client coupled to the real-time clock, the network client containing circuitry to receive timing information from a time server coupled to the communications processor via a network and to provide time adjustments to the real-time clock.

An advantage of a preferred embodiment of the present invention is that a large variety of communications links, preferably wireless, can be used to provide the needed accurate timing information that will help the SPS receiver acquire the signal transmitted by the SPS satellites. It generally does not require the use of a specific type of communications link (such as a particular type of cellular telephone network).

A further advantage of a preferred embodiment of the present invention is that the present invention makes use of an existing infrastructure of accurate time keeping hardware, rather than requiring the installation of any of these expensive pieces of equipment.

Yet another advantage of a preferred embodiment of the present invention is that due to the present invention's flexibility, it can be operable in a larger set of conditions and environments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 1a and 1b are diagrams of an exemplary satellite positioning system (SPS) with a SPS receiver and a plurality of SPS satellites operating normally and in an environment when a signal from the SPS satellites are attenuated by physical objects;

FIG. 2 is a diagram illustrating an exemplary SPS system wherein a SPS receiver is provided accurate time information via a secondary source, according to a preferred embodiment of the present invention;

FIGS. 3a–3d are diagrams illustrating various systems that provide a SPS receiver with time information via a secondary source, according to a preferred embodiment of the present invention;

DETAILED DESCRIPTION OF ILLUSTRATIVE EMBODIMENTS

Figure 3B:
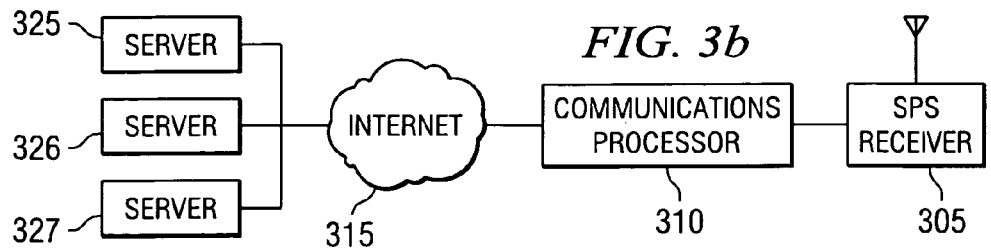

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Global Positioning System (GPS) receiver that is coupled to a communications processor that is, in turn, connected to a time server, wherein the communications processor makes use of time information provided by the time server through a communications network to assist the GPS receiver. The invention may also be applied, however, to other satellite positioning systems (such as differential GPS (DGPS), Global Navigation Satellite System (GLONASS), or the Galileo system (currently under development)) whose receivers require accurate timing information to acquire the signals transmitted by the satellites, wherein the accurate timing information can be provided to the receivers through a large variety of ways, such as wireless (radio frequency, infrared, microwave, etc.) and wired (fiber optic, coaxial cable, etc.).

With reference now to FIG. 1a, there is shown a diagram illustrating an exemplary satellite positioning system (SPS) including a SPS receiver 110 and a plurality of SPS satellites 105, 106, and 107 from which the SPS receiver 110 is capable of receiving a transmitted signal. In a SPS system, for example, the Global Positioning System (GPS) or Navstar system, the SPS receiver 110 typically receives a unique signal from each of several SPS satellites (typically three or four). From these unique signals, the SPS receiver 110 is capable of determining its precise location and an accurate time.

In addition to carrying information, the signal that is transmitted from each SPS satellite is uniquely encoded so that a SPS receiver can determine the identity of the source SPS satellite from the received signal. In the GPS system, for example, each GPS satellite transmits a signal containing a timing reference that a GPS receiver can detect and use to determine a timing offset between itself and the particular GPS satellite. Generally, this timing offset, when used in conjunction with at least three additional timing offsets (received signals from other GPS satellites), permits the GPS receiver to accurately resolve its position (including longitude, latitude, and altitude) and time.

When a SPS receiver (for example, SPS receiver 110) is first turned on, it must acquire a requisite number of transmitted signals from different SPS satellites. The acquisition process requires that the SPS receiver 110 correlate signals it is receiving with a locally stored copy of a particular signal for which it is searching. Correlation involves the multiplication of the locally stored copy with the received signals and a match occurs when the result of the multiplication exceeds a predetermined threshold. Correlating signals is well understood by persons of ordinary skill in the art of the present invention.

The correlation process is a time consuming procedure and the acquisition process may take up to several minutes or more. Some SPS receivers attempt to speed up the correlation process by using several correlators operating in parallel. The time required to perform the correlation can be further extended when the signal being received by the SPS receiver is weak. In fact, if the signal power of the received signal is too low (even if the signals are in fact present), the SPS receiver may not be able to acquire the requisite number of SPS satellites. As discussed previously, the signals transmitted by the SPS satellites are very low, being limited by power considerations and perhaps, governmental regulations.

With reference now to FIG. 1b, there is shown a figure illustrating a situation wherein the SPS receiver 110 is not able to acquire the requisite number of SPS satellites 105, 106, and 107 due to the fact that it is operating in an environment that is attenuating the transmitted signals of the SPS satellites; The signal attenuation may be the result of the SPS receiver 110 being operated under thick foliage, inside of buildings and parking structures, inside a car that is inside a tunnel, etc. Note that regardless of the cause of the signal attenuation, it is represented in FIG. 1b as a box 115.

With an attenuated signal(s), the correlations being performed by the SPS receiver 110 may never reach the predetermined threshold that signifies that the desired signal has been received, even though the desired signal is indeed being received (at a low power level). In a best case scenario, the acquisition process is made significantly longer. In a worst case scenario, the SPS receiver 110 is not able to acquire a sufficient number of SPS satellites and the system is inoperable.

Perhaps the most vital piece of information provided by the SPS satellites is the accurate time. With an accurate time (and other ephemeris data), the SPS receiver 110 can determine the timing offset and therefore its position. When provided with an accurate time, the SPS receiver 110 can effectively narrow its search when it is performing the correlation process. For example, the SPS receiver 110 can be provided with a list of SPS satellites from which it should be able to receive transmissions. Combined with the accurate time, the SPS receiver 110 knows to correlate for transmitted signals lying within a certain range of time offsets from the accurate time information provided to it, rather than having to search for transmitted signals with any time offset. This can greatly narrow the search space and expedite the acquisition process. Additionally, with the narrower search space, the SPS receiver 110 may be able to reduce the correlation threshold and perform a "finer" search that it would not have been able to perform if it could not have reduced the search space.

With reference now to FIG. 2, there is shown a figure illustrating an exemplary SPS system wherein a SPS receiver 210 is provided with accurate time information via a secondary source rather than deriving the time information from signals transmitted by a plurality of SPS satellites 205, 206, and 207, according to a preferred embodiment of the present invention.

The SPS receiver 210 is coupled to a communications processor 220, which allows it to receive the time information from the secondary source. The communications processor 220 communicates to a time server 225 via a communications network 230, for example, the Internet. Alternatively, the communications processor 220 may make use of a private or proprietary network to communicate to the time server 225. Additionally, the communications network 230 may be a synchronous or asynchronous network. According to a preferred embodiment of the present invention, the communications processor 220 is coupled to the Internet 230 via a first communications link 235 and the time server 225 is coupled to the Internet 230 via a second communications link 240.

The time server 225 is not necessarily a part of the network 230. Rather, the time server 225 is simply accessible via the network 230. Therefore, the network 230 is a means for the communications processor 220 to access the information provided by the time server 225. The fact that the time server 225 is not a part of the network 230 relaxes any restrictions that may be placed upon the particular type of network implemented for network 230. In contrast a prior art embodiment restricts the network 230 to be a particular type of cellular telephone network wherein the cellular telephone network has its own built-in time server.

According to a preferred embodiment of the present invention, the first communications link 235 may be a cellular telephone link using WAP (Wireless Access Protocol), GPRS (General Packet Radio Service), EDGE (Enhanced Data rates for GSM. Evolution), etc. Alternatively, the first communications link 235 may be a part of a wireless communications network adherent to a widely available technical standard such as (but not necessarily limited to) IEEE 802.11a, IEEE 802.11b, IEEE 802.11g, Bluetooth, HomeRF Working Group, HiperLan, etc. or the first communications link 235 may be a part of a proprietary wireless communications network. As yet another alternative, the first communications link 235 may be a wired link using coaxial cable, fiber optic twisted pair phone lines, alternating current (AC) power lines, etc. Note that the second communications link 240 may be implemented out of one of the many different types of communications links listed above as well.

According to a preferred embodiment of the present invention, the SPS receiver 210 and the communications processor 220 may be integrated into a single unit (such as a cellular telephone, a personal digital assistant (PDA), a computer, a telemetry device or implant, a medical alert bracelet, a mobile entertainment system, etc.) or they may be separate units that are coupled together via either a wired or wireless connection. The communications processor 220 in and of itself may be a computer, PDA, cellular telephone, or a dedicated device that is intended to permit the coupling of the SPS receiver 210 to remotely located time servers 225.

With reference now to FIG. 3a, there is shown a diagram illustrating a high-level view of a system for providing a secondary time source to a SPS receiver, according to a preferred embodiment of the present invention. The system includes a SPS receiver 305 (for example, a GPS receiver) that is capable of receiving transmissions from a plurality of SPS satellites (not shown). In addition to receiving transmissions from the SPS satellites, the SPS receiver 305 is coupled to a communications processor 310. As discussed previously, the SPS receiver 305 and the communications processor 310 may be packaged together into a single electronic device, such as a SPS enabled cellular telephone, computer, or PDA. Alternatively, the SPS receiver 305 and the communications processor 310 may be self contained entities that are capable of communicating with one another through a wired or wireless connection, such as a portable computer (or PDA or cellular telephone) connected to the SPS receiver 305 through a cable.

The communications processor 310 has the capability to communicate to a time server 320 through a network 315. The network 315 may be a publicly accessible network such as the Internet or it may be a private proprietary network. It is through the network 315 that the communications processor 310 communicates to the time server 320 and to obtain accurate time information.

An example of a publicly available server for accurate time is the plurality of network time protocol (NTP) servers that are located throughout the world. The NTP servers usually operate by responding to time requests (though there are some that are configured to periodically broadcast the time) from NTP clients. Access to the NTP servers is available to any compatible client via the Internet.

NTP servers are classified into one of fourteen possible strata, with stratum one NTP servers being synchronized to national time standards (such as atomic clocks) via radio, satellite, and modem. Stratum two (and lower) NTP servers are directly connected to the stratum one NTP servers through hierarchical subnets, with the greater the stratum number, the greater the expected difference in the time provided by the particular NTP and the national time standards. Due to accuracy issues, it is preferred that the NTP servers used in the present invention not be stratum four servers or below. However, through the use of some precision time recovery techniques, it may be possible to use the lower strata NTP servers.

Another example of a publicly accessible time server is radio stations that transmit time signals. The National Institute of Standards and Technology (NIST) operates two radio stations (station WWV based in Colorado and station WWVH based in Hawaii) that broadcast voice and tonal beacons indicating exact times. These two radio stations can be picked up by any short-wave radio. The NIST also operates a telephone-based time reference, wherein time information can be received by dialing a particular telephone number. Devices that permit the interfacing of radio transmissions and telephony to communications networks, such as the Internet, may be used to permit access to radio frequency based time servers (such as Wwv) and telephony based servers by the communications processor 310.

The communications processor 310, after receiving the accurate time information from the time server 320, may then provide the time information to the SPS receiver 305. As discussed previously, the SPS receiver 305 can use the time information provided by the communications server 310 to assist it in acquiring the transmitted signals from the SPS satellites (not shown).

With reference now to FIG. 3b, there is shown a diagram illustrating a high-level view of a different embodiment of a system for providing a secondary time source to a SPS receiver wherein there are a plurality of servers. The system illustrated in FIG. 3b differs from the system illustrated in FIG. 3a mainly in that there are a plurality of time servers (three time servers 325, 326, and 327 are shown). With more than one server, the communications processor 310 is able to request time from several different servers and then combine the information provided by the different servers. This combination maybe used to provide a more accurate time. The communications processor 310 would then provide the time to the SPS receiver 305.

Figure 3C:
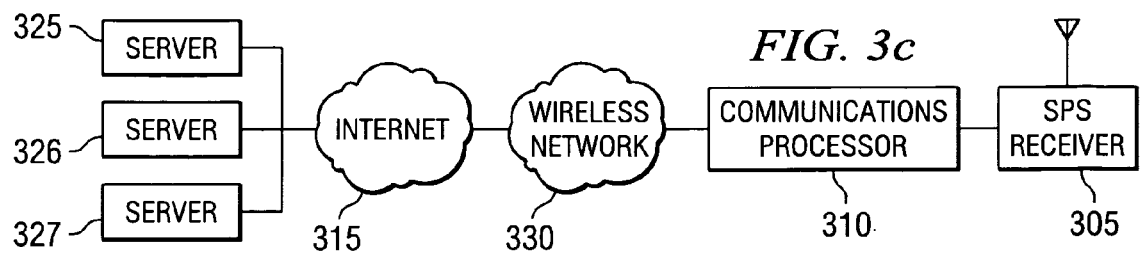
Figure 3D:
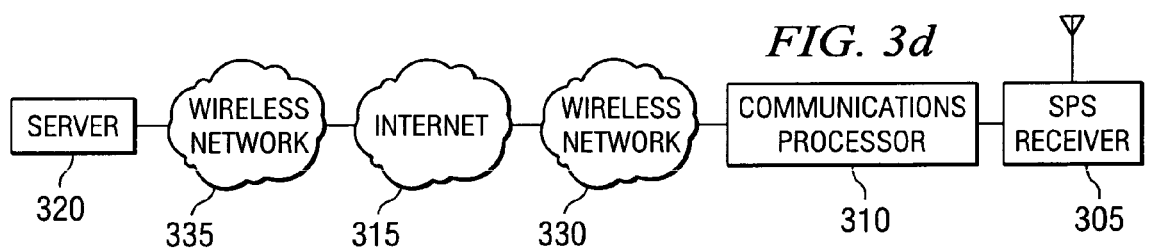

With reference now to FIGS. 3c and 3d, there are shown diagrams illustrating a high-level view of two different embodiments of a system for providing a secondary time source to a SPS receiver 305 wherein a communications processor 310 (FIG. 3c) and a server 320 (FIG. 3d) are coupled to a network 315 through a wireless network. The use of a wireless network 330 (and 335) to permit the communications processor 310 (and server 320) to connect to the network 315 allows a great degree of freedom in terms of the mobility of the communications processor 310 and the SPS receiver 305 (and the server 320). For example, the communications processor 310 may be a PDA with an IEEE 802.11b wireless network card and the SPS receiver 305 may be built-into the PDA. The user of the PDA is then free to roam throughout the effective coverage area of an IEEE 802.11b wireless network and still have the communications processor 310 maintain contact with the servers 325, 326, and 327 to provide accurate time to the SPS receiver.

The wireless network 330 (and wireless network 335) may be a wireless data network such as an IEEE 802.11a, IEEE 802.11b, IEEE 802.11g, Hiperlan, Bluetooth, HomeRF working group, etc., or it may be a cellular telephone network such as Global System for Mobile Communications (GSM), Code Division Multiple Access (CDMA), Time Division Multiple Access (TDMA), WAP, EDGE, GPRS, etc. Alternatively, the wireless network 330 may be a proprietary network using radio frequency or optical technology. Other wireless communications technology may also be used, as long as they are capable of carrying data traffic.

Figure 4A:
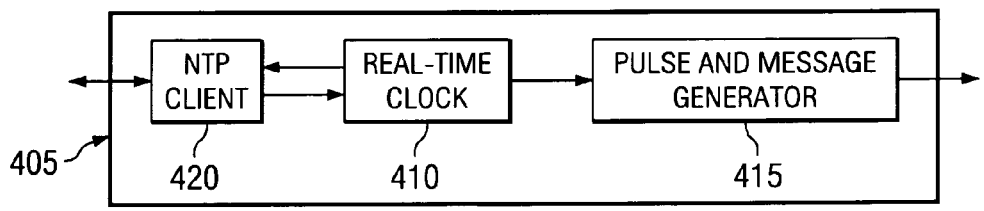
FIGS. 4a and 4b are diagrams illustrating functional views of a communications processor that is used to provide a SPS receiver with time information from a secondary source, according to a preferred embodiment of the present invention.

With reference now to FIG. 4a, there is shown a diagram illustrating a functional diagram of a communications processor 405 that is used in a system for providing timing information to a SPS receiver via a secondary source, according to a preferred embodiment of the present invention. The communications processor 405 is coupled to a SPS receiver (not shown) at one end and a network (not shown) that permits it to communicate with a server (not shown). The communications processor 405 includes, among other things, a real-time clock 410, a pulse and message generator (PMG) 415, and a NTP client 420.

The real-time clock 410 is a clock that is local to the communications processor 405 and may or may not be sufficiently accurate for use in providing timing information to the SPS receiver (not shown). Coupled to the real-time clock 410 is the PMG 415. The PMG 415 is responsible for generating control signals for use in providing the timing information received from the servers (not shown) to the SPS receiver. The PMG 415 may be a computer program executing on a processing element of a communications processor 405 that can assert certain values on signal lines. It may also be a dedicated circuit that is used to generate the control signals or it may be a portion of a general purpose signal generator. For example, the PMG 415 may be configured to provide a timing pulse to the SPS receiver and at about the same time, provide a time message to the SPS receiver indicating the actual time that corresponds to the timing pulse. The timing pulse would function as a beacon for the time that is provided to the SPS receiver in the time message. The timing pulse lets the SPS receiver know that when it receives the pulse, the time is as indicated in the time message. According to a preferred embodiment of the present invention, the time in the time message corresponds to the rising edge of the timing pulse. Alternatively, the time in the time message may correspond to the falling edge of the timing pulse, or may correspond to another portion of the pulse.

Note that it is generally more important for the PMG 415 to generate the timing pulse at precisely the intended time than the time message carrying the time of the timing pulse. This is because the timing pulse provides the actual timing information while the time message only conveys a label corresponding to the timing information carried in the timing pulse. Therefore, the degree of precision related to the time message need not be as high as for the timing pulse.

Also coupled to the real-time clock 410 is the NTP client 420. The NTP client 420 is an implementation of the protocols needed to support communications between the communications server 405 and a NTP server (not shown). According to a preferred embodiment of the present invention, the NTP client 420 may be implemented as a software procedure that executes on processing unit or it may be built from hardware and firmware to implement the NTP communications protocol. Note that if a different time server was to be used in place of the NTP server, then a different client would be used in place of the NTP client 420, for example, a time server using a different protocol or even the NIST radio (for example, WWV), then the NTP client 420 may be replaced with a different client that is compatible with the different protocol. The NTP client 420 is configured to send out a time request to a NTP server (or perhaps a plurality of NTP servers). When the NTP server responds, the NTP client 420 time corrects the response to compensate for any network latency. According to a preferred embodiment of the present invention, the NTP client 420 then provides to the real-time clock 410 a time adjustment (if any is needed) that the real-time clock 410 should use to correct or discipline its clock. Alternatively, the NTP client 420 can provide the time corrected response from the NTP server directly to the real-time clock 410, which will then make any needed changes to its clock.

Alternatively, rather than configuring the NTP client 420 (or some other client) to periodically sending a query and then waiting for a response from the NTP server, the NTP client 420 can be configured to listed to a NTP server that is configured to periodically broadcast the current time. This preferred embodiment reduces the amount of network traffic by eliminating the need for the NTP client 420 to transmit the query.

According to a preferred embodiment of the present invention, the real-time clock 410 can be configured to periodically test to determine whether its clock is accurate. For example, the real-time clock could request the NTP client 420 to request a current time from a NTP server once every minute. Note that more frequent requests may only serve to clog the network, impairing performance, while less frequent requests may allow the clock in the real-time clock 410 to drift too far from the actual time, making it more difficult for the SPS receiver to acquire the transmissions from the SPS satellites.

Figure 4B:
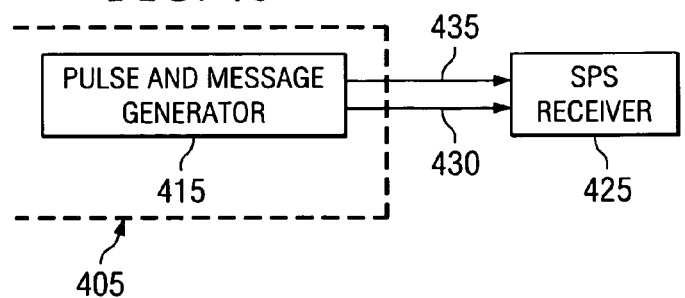

With reference now to FIG. 4b, there is shown a diagram illustrating a detailed view of the PMG 415 and a SPS receiver 425. According to a preferred embodiment of the present invention, the PMG 415 and the SPS receiver 425 are connected via two signal lines. A first signal line 430 can be a simple line and is used to provide a timing pulse from the PMG 415 to the SPS receiver 425. The timing pulse is used as a beacon to let the SPS receiver 425 know that when it receives the timing pulse, the actual time is the time that is specified in a message provided by the PMG 415 over a second signal line 435. The message provided to the SPS receiver 425 over the second signal line 435 carries a time that was originally provided by the NTP server (not shown) and then corrected to the base reference time of the SPS system (if needed). For example, in a GPS system, the NTP server may provide the actual time referenced to Greenwich Mean Time, also commonly referred to as Coordinated Universal Time (UTC). There is currently a 13 second offset between UTC and GPS system time. This offset must be compensated for in the time message provided to a GPS receiver. Note that the 13 second offset between UTC and GPS system time may change.

In using widely available computers, PDAs, and other devices as communications processors, a problem may be encountered with the general accuracy of the real-time clock that is present in these devices. Although the real-time clocks are normally precise enough for general computing purposes, the majority of the real-time clocks built-into these devices are normally not accurate to the micro-second range or the software controlling the devices (the operating system) does not exploit the full accuracy of the real-time clocks. Therefore, it can be advantageous to use an additional clock that can be more precise that the built-in real-time clock to provide a reference clock signal to help maintain accuracy in the timing pulses generated by the communications processor. The additional clock may be a secondary clock that is present in a computer or PDA that is being used as a communications processor. For example, in computers that use Intel branded microprocessors, there is a counter referred as a performance counter that may be used as an additional clock. Also, SPS receivers in general have a relatively accurate built-in clock that may be used as an additional clock.

Figure 5A:
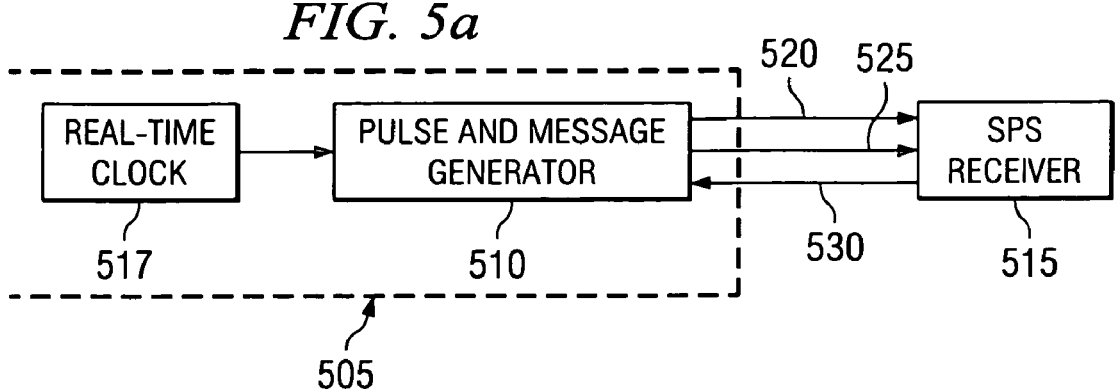
FIGS. 5a–5c are diagrams illustrating the use of an additional clock to provide a reference signal to ensure accuracy of a real-time clock in systems that are used to provide a SPS receiver with time information from a secondary source, according to a preferred embodiment of the present invention.

With reference now to FIG. 5a, there is shown a diagram illustrating a portion of a system for providing a SPS receiver 515 with secondary timing information, wherein an additional clock (not shown, but is located in the SPS receiver 515) is used to provide a reference signal, according to a preferred embodiment of the present invention. The portion of the system displayed includes a part of a communications processor 505, the SPS receiver 515, and a series of signal lines 520, 525, and 530 between the two. Note that while the SPS receiver 515 needs an accurate time reference (either from the SPS satellites or a secondary source), most SPS receivers also include a built-in real-time clock with a high degree of accuracy. According to a preferred embodiment of the present invention, the SPS receiver's built-in real-time clock (not shown) is used to provide a reference clock signal to help maintain the accuracy of the communication processor's real-time clock (not shown).

According to a preferred embodiment of the present invention, the SPS receiver's real-time clock is configured to regularly send a pulse to the communication processor 505, one pulse every one millisecond, for example. This pulse can be sent over signal line 530. This pulse is then forwarded to the PMG 510. The PMG 510 receives these pulses and keeps a count of the number of pulses that it receives. Then, when time arrives for the PMG 510 to send the next timing pulse to the SPS receiver 515, the PMG 510 compares the number of pulses it has received from the SPS receiver's real-time clock against the expected number of pulses. Any difference between the expected number of pulses and the actual number of pulses indicates an inaccuracy in the communication processor's real-time clock 517 and that adjustments should be made to the real-time clock 517 and/or the timing pulse and the time message. An algorithm for using an additional reference signal to help maintain accuracy of the communication processor's real-time clock and the timing pulse sent to the SPS receiver is presented below.

Figure 5B:
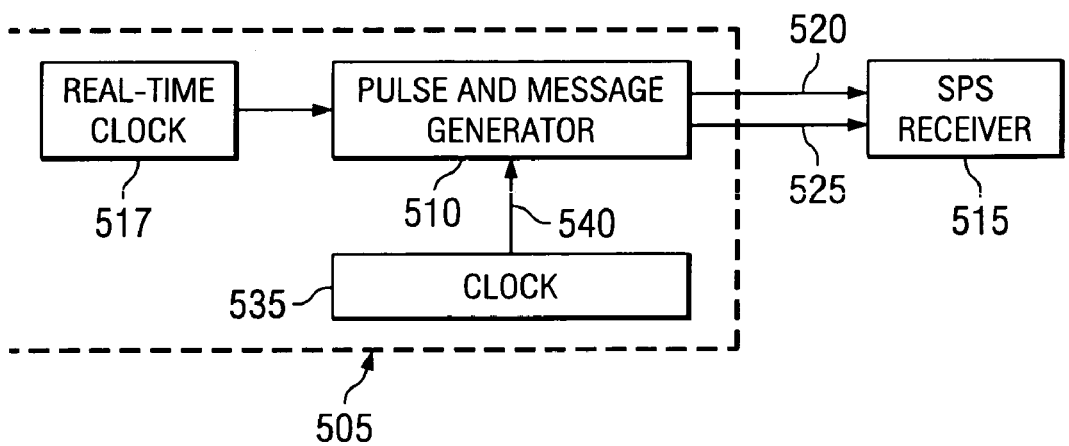
Figure 5C:
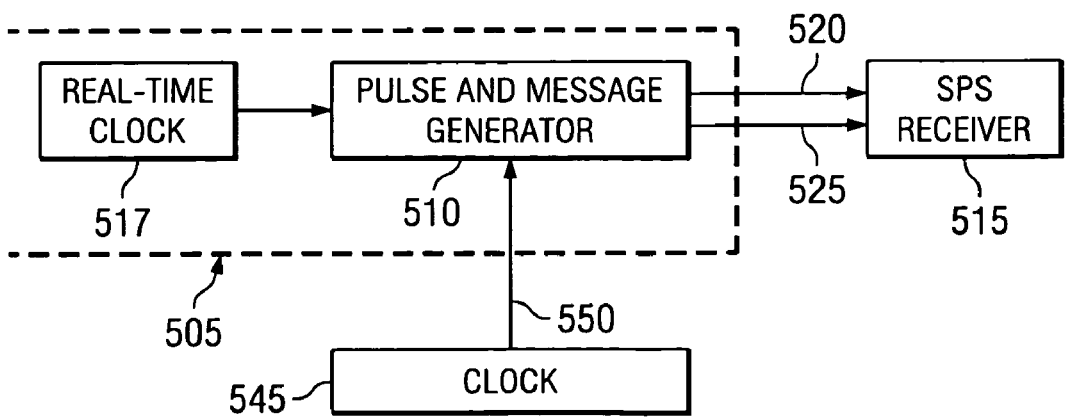

With reference now to FIGS. 5b and 5c, there are shown diagrams illustrating two different embodiments of a system for providing the SPS receiver 515 with secondary timing information, wherein an additional clock is used to provide a reference signal. The additional clock may be internal to the communications processor 505 as displayed in FIG. 5b or external to the communications processor as displayed in FIG. 5c. The use of the additional clock to provide a timing reference may be similar to the function of the SPS receiver's real-time clock as described above.

Figure 6:
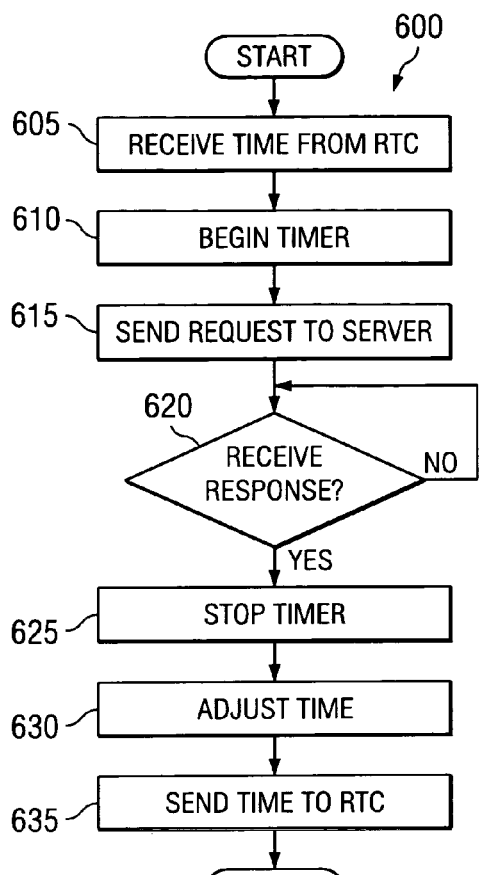
FIG. 6 is a flow diagram for use in controlling the operating of a network time protocol (NTP) client, according to a preferred embodiment of the present invention.

With reference now to FIG. 6, there is shown a flow diagram illustrating an algorithm 600 controlling the operation of a NTP client, according to a preferred embodiment of the present invention. The NTP client is likely to be an application executing on a processing element of a communications processor, and the algorithm 600 illustrates the program flow of the NTP client.

The NTP client becomes active after it receives a current time signal from the communication processor's real-time clock (block 605). The current time signal from the real-time clock transmits the real-time clock's current time to the NTP client. Alternatively, the NTP client can be awakened by an interrupt request, a message, a particular value written into a specific register or memory location, etc. After it becomes active, the NTP client begins a timer (block 610). The purpose of the timer is to measure the amount of time (latency) that it takes for a request to a NTP server to be serviced and the result returned to the NTP client. The time that is measured by the timer is then used to correct for the latency. Generally, this is a needed step because the general purpose network (for example, the Internet) used to couple the communications processor to the NTP server has a boundless latency that can vary significantly (and unpredictably) with time.

After starting the timer, the NTP client transmits a request to the NTP server (block 615). After transmitting the request, the NTP client enters a spin-lock (block 620) to wait for the response from the NTP server. Alternatively, the NTP client may be able to perform other tasks while it is waiting for the response from the NTP server. An example of the NTP client performing other tasks can include sending additional time requests to other NTP servers. Once the NTP client receives the response from the NTP server, the timer is stopped (block 625) and the time in the timer is used to make adjustments to the time provided by the NTP server due to the latency (block 630). If the NTP client transmitted several time requests to several different NTP servers, the NTP client would wait until it has received responses from each of the NTP servers and create an average time from the several responses. Preferably, the NTP client can have an expiration timer wherein if the expiration timer expires, the NTP client will stop waiting for any outstanding requests and go ahead and create an average time from the responses that it has already received. The NTP client could maintain a separate timer for each of the requests to the different NTP servers, in order to maintain an accurate track of the latency.

The adjusted time is then provided to the real-time clock (block 635). According to a preferred embodiment of the present invention, the NTP client does not return the adjusted time to the real-time clock. Rather, the NTP client calculates how much (if any) time the real-time clock needs to correct its own clock by and returns the needed correction to the real-time clock.

Figure 7A:
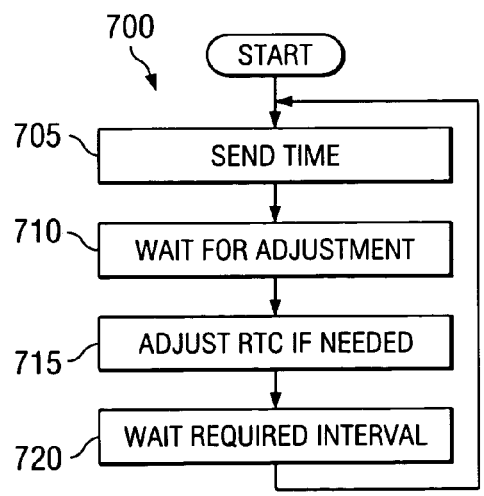
FIGS. 7a and 7b are flow diagrams used in controlling a real-time clock, according to a preferred embodiment of the present invention.

With reference now to FIG. 7a, there is shown a flow diagram illustrating an algorithm 700 for sending a request for timing information from a NTP server and making any needed adjustments to the communication processor's real-time clock, according to a preferred embodiment of the present invention. In most electronic devices, the real-time clock is a physical hardware device that can be controlled by a software program. The software program can be used to check, adjust, set, start, stop, etc. the real-time clock. The algorithm 700 may be a part of the control program and may be executing on a processing element of the communications processor.

In order to maintain a needed level of accuracy, the real-time clock's clock should be periodically checked and adjusted. The frequency of the checks needs to be weighed against placing too great a load on the communication processor's processing element, creating too much network traffic (which can increase latency), and maintaining the required level of accuracy. According to a preferred embodiment of the present invention, the real-time clock's clock is checked once a minute, although the frequency can be different depending upon a weighing of the various trade-offs discussed above.

Once a minute (or at the desired frequency), the control program for the real-time clock transmits the real-time clock's current time to the NTP client (block 705). According to a preferred embodiment of the present invention, this is the signal to the NTP client to initiate a time request to the NTP server(s). Alternatively, the control program may simply assert an interrupt to the NTP client or it may write a specified value to a special register or memory location. After initiating the time request, the control program waits (block 710) until it receives a clock adjustment from the NTP client. If the real-time clock needs adjustment, then the control program adjusts the real-time clock's clock (block 715). The control program then waits in block 720 until it is time again to check the accuracy of the real-time clock's clock. Note that if the algorithm 700 is part of a control program for the real-time clock, the control program may be performing other tasks while the algorithm 700 is waiting.

In addition to maintaining the current time, the real-time clock is used to provide the accurate time information to a SPS receiver. As discussed above, the real-time clock maintains an accurate clock by periodically adjusting its clock with the time provided by a NTP server(s) and perhaps through the use of a reference signal from an additional clock. The time in the SPS receiver is kept accurate by periodically updating the time in the SPS receiver with the time maintained in the real-time clock. According to a preferred embodiment of the present invention, once the SPS receiver has locked on to SPS satellites, the SPS receiver will be able to accurately maintain its own time by decoding transmissions from the SPS satellites. Therefore, it may no longer be necessary to continue delivering secondary time information to the SPS receiver after it has acquired the SPS satellites.

Figure 7B:
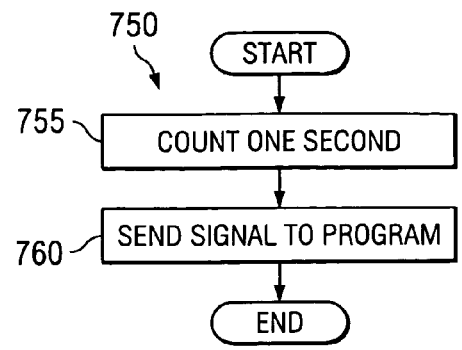

With reference now to FIG. 7b, there is shown a flow diagram illustrating an algorithm 750 for use in periodically providing a beacon signal that is used by a pulse and message generator (PMG) to provide an accurate time to a SPS receiver, according to a preferred embodiment of the present invention. The algorithm 750 can be part of a control program that is generally responsible for the function of the real-time clock, the same control program containing the algorithm 700 (FIG. 7a) used to periodically adjust the real-time clock's time. The algorithm 750 basically waits for a specified period of time, for example, one second (block 755) and then, in block 760, sends a beacon signal to the PMG (a computer program or a dedicated piece of circuitry) that is used to generate and transmit timing signals to the SPS receiver. Note that the amount of time that the algorithm 750 waits between sending beacon signals can be changed and is dependent upon many factors, such as, clock accuracy, desired level of accuracy, desired acquisition performance, etc.

Figure 8B:
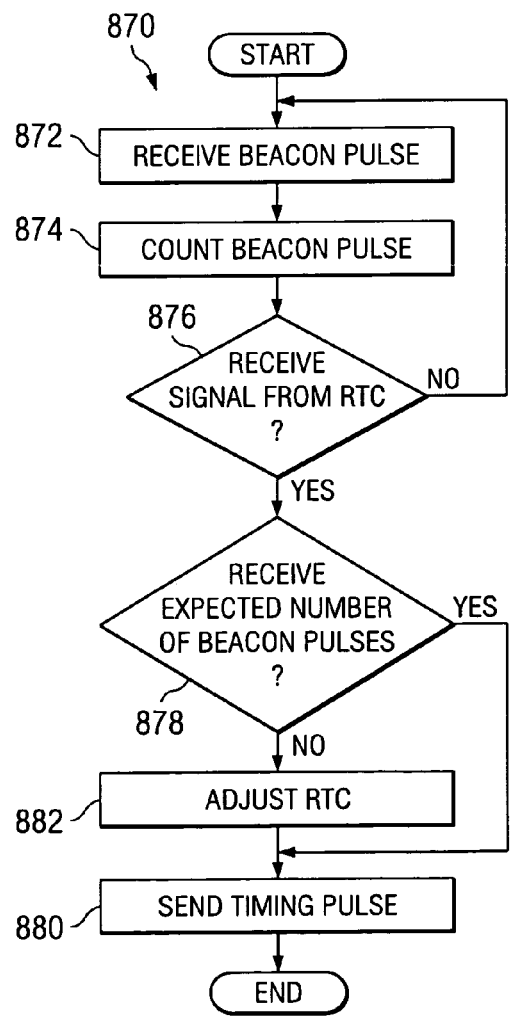
FIGS. 8a and 8b are flow diagrams used in controlling the operation of a pulse and message generator (PMG), according to a preferred embodiment of the present invention.
Figure 8A:
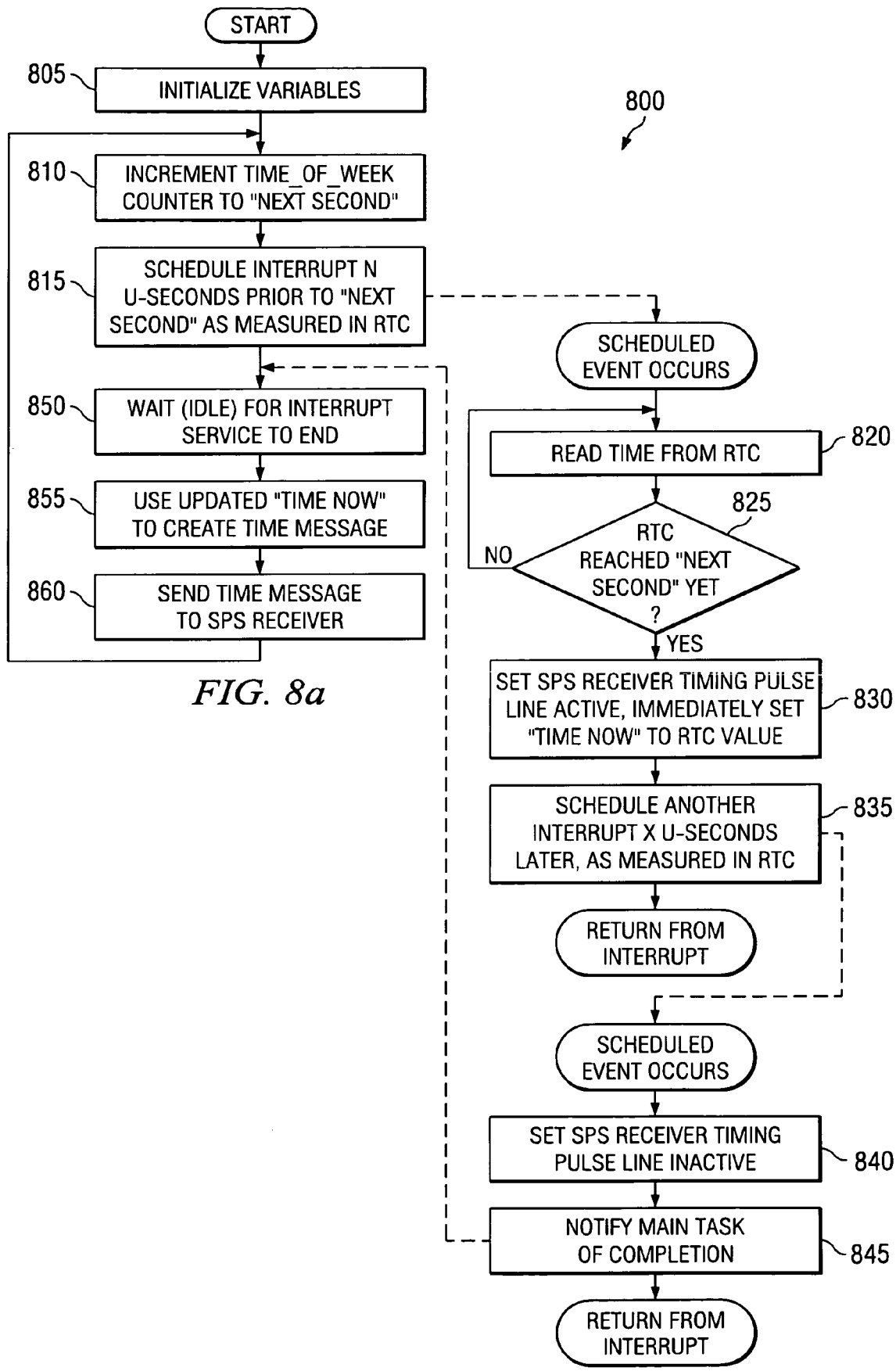

With reference now to FIG. 8a, there is shown a flow diagram representing an algorithm 800 that is used to control the operation of a pulse and message generator (PMG) in the generation of a timing pulse and a timing message to be transmitted to a SPS receiver, according to a preferred embodiment of the present invention. According to a preferred embodiment of the present invention, the control program uses the algorithm 800 to generate the timing pulse and the timing message that is periodically transmitted to the SPS receiver. As discussed previously, the timing pulse is used to mark an exact instant in time (to within the accuracy parameters of the real-time clock) of the occurrence of the time contained in the timing message.

The control program begins by initializing a set of local variables that are used in a local timing loop (block 805). The control program the increments an SPS time-of-week counter to a number that is a representation of the "next second" (block 810). The "next second" represents the next whole second that is to occur. After incrementing the SPS time-of-week counter the control program schedules an interrupt to occur N microseconds prior to the occurrence of the "next second" (block 815). The specific value of N is a predetermined value and may be user specifiable. Examples of factors that have an effect on the value of N may include the speed of the communications processor (how fast it responds to an interrupt request), the expected amount of other activity the communications processor is expected to be performing, etc. The control program then can become idle until the occurrence of the interrupt.

When the scheduled interrupt occurs, the control program will read the time of the real-time clock (block 820) and will check to see if the time of the real-time clock has reached the time of the "next second" (block 825). If the time of the real-time clock has not reached the time of the "next second", the control program will continue to check the time of the real-time clock until it does indeed reach the "next second" (blocks 820 and 825).

When the real-time clock does reach the "next second", the control program sets the timing pulse line to the SPS receiver active and immediately sets the contents of a memory location, "time now", to a value of the time in the real-time clock (block 830). The memory location "time now" may be a register or it may be a part of normal memory, such as a stack or random access memory. The contents of "time now" will later be used to create a time message to be delivered to the SPS receiver. The activation of the timing pulse line represents the beginning of the timing pulse that is transmitted to the SPS receiver. The control program then will schedule a second interrupt that will occur X microseconds later (block 835), wherein X is a predetermined value and may be user specifiable. Again, the value of X is dependent on factors such as the speed of the communications processor (how fast it responds to an interrupt request), the expected amount of other activity the communications processor is expected to be performing, etc.

When the second scheduled interrupt occurs (X microseconds after it was scheduled), the control program will deactivate the timing pulse line to the SPS receiver (block 840) and notifies the successful completion of the task (block 845). The control program then returns to block 850 where it had been waiting for the interrupt service to complete. The control program will create a time message from the contents of the "time now" memory location (block 855) and sends the time message to the SPS receiver (block 860). As discussed previously, the time message conveys information regarding the actual time of the leading edge of the timing pulse. Note that the transmission of the timing message is not as time-critical as the transmission of the timing pulse. This is due to the fact that the timing message is simply providing a "label" for the time marker, the timing pulse.

With reference now to FIG. 8b, there is shown a flow diagram illustrating an algorithm 870 for use by control program for a PMG to provide an accurate time to a SPS receiver, wherein the algorithm 870 makes use of a clock signal (in the form of beacon pulses) from an additional clock to enhance the accuracy of the real time clock, according to a preferred embodiment of the present invention. The algorithm 870 can be part of a control program that is generally responsible for the function of the PMG.

The control program operates by receiving (block 872) and counting (block 874) a series of beacon pulses from the additional clock. For example, if the period between the timing signals that are transmitted by the PMG is a second and the period of the beacon pulses from the additional clock is one millisecond, then the control program would expect to receive one thousand (1000) beacon pulses before the PMG transmits an additional timing signal (if it starts to count the beacon signals immediately after the PMG transmits a timing signal). The control program continues to count the beacon pulses that it receives until it receives a beacon signal from the RTC (block 876).

Once the control program receives the beacon signal from the RTC (block 876), the control program checks to see if it has counted the expected number of beacon pulses (block 878). For example, if the beacon signals arrive once a second and the beacon pulses arrive once a millisecond then the control program would expect to receive one thousand beacon pulses.

If the number of received beacon pulses matches the expected number, then the PMG sends a timing pulse to the SPS receiver without making any adjustments. However, if the number of received beacon pulses does not match the expected number, then the control program will need to make some adjustments. For example, the control program may make adjustments to the timing message that it sends to the SPS receiver or the control program may send a signal to the real-time clock to notify it that it should perform an adjustment (block 882). As an example, if the number of received beacon pulses is less than the expected number, then the real-time clock is fast and needs to be slowed down (or the timing message needs to reflect an earlier time). Alternatively, if the number of received beacon pulses is greater than the expected number, then the real-time clock is slow and needs to be sped up (or the timing message needs to reflect a later time).

As previously discussed, an alternate embodiment of the present invention makes use of an additional clock to help provide a more accurate real-time clock via the use of timing beacons from the additional clock. According to the alternate embodiment of the present invention, since the additional clock is used to help ensure accuracy of the real-time clock (or to modify the timing message), it does not necessarily have a direct impact on the algorithm 800 which is used to control the operation of the PMG. The algorithm 870 (illustrated in FIG. 8b) may operate independently of the algorithm 800. The algorithm 800 as discussed above can be used with a real-time clock that features (or does not feature) the use of an additional clock to help ensure the accuracy of the real-time clock.

The algorithm 800 (FIG. 8a) can be modified to make use of beacon pulses generated by a real-time clock located in the SPS receiver (not shown) or other additional clock may be used to schedule the interrupt. For example, blocks 815 and 835 can be modified to schedule interrupts after counting a certain number of beacon pulses. Alternatively, it is also possible to count down a certain number of beacon pulses until N microseconds prior to the "NEXT SECOND" (block 815).

Figure 9A:
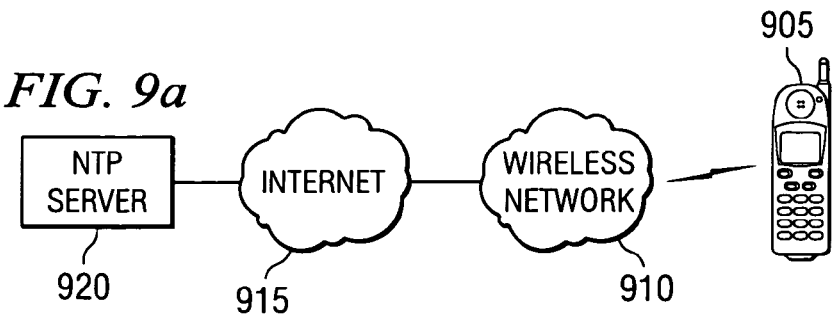
FIGS. 9a and 9b are diagrams illustrating two-exemplary SPS systems making use of a wireless network connected to a public access network to obtain time information from a NTP server, according to a preferred embodiment of the present invention.
Figure 9B:
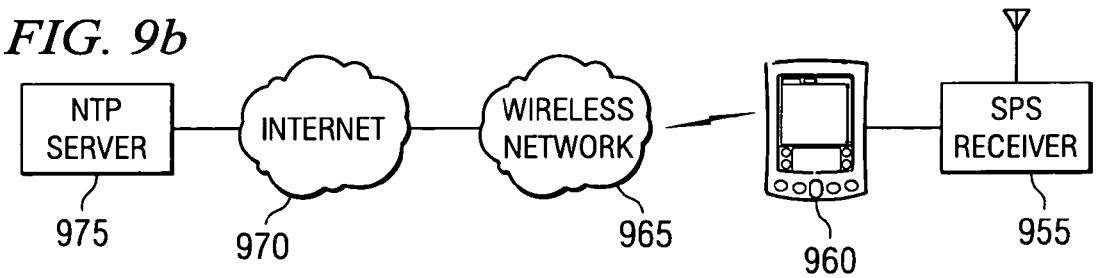

With reference now to FIGS. 9a and 9b, there are shown two diagrams illustrating exemplary systems for providing secondary timing information to a SPS receiver, according to a preferred embodiment of the present invention. FIG. 9a displays a system wherein a mobile unit 905 which includes a built-in SPS receiver (not shown) connects to a wireless network 910 which, in turn, provides access to a public network 915, such as the Internet, and the public network 915 provides access to one or more NTP servers 920. The mobile unit 905 can be thought of as having a built-in communications processor (not shown). The mobile unit 905 may connect to the wireless network 910 via a cellular network (such as CDMA cellular, TDMA cellular, GSM, EDGE, GPRS, etc.) or via a short range wireless communications network (such as IEEE 802.11a, IEEE 802.11b, IEEE 802.11g, Bluetooth, etc.). The wireless network 910 may be thought of as a bridge between the mobile unit 905 and the public network 915. The public network 915 would also function as a second bridge between the NTP server(s) 920 and the mobile unit 905.

FIG. 9b displays a similar system, with the exception of having a disjoint SPS receiver 955 and PDA 960 (which is operating as a communications processor). An example of such a configuration may be a PDA with a peripheral that is connected to the PDA. The peripheral may include a SPS receiver (an example of such a peripheral would be a mapping device that a user can purchase to help provide driving instructions). As discussed above, the PDA 960 could then connect to an NTP server 975 through a public network 970, to which it connects via a wireless network 965 that may be a cellular network or a wireless communications network.

Figure 10:
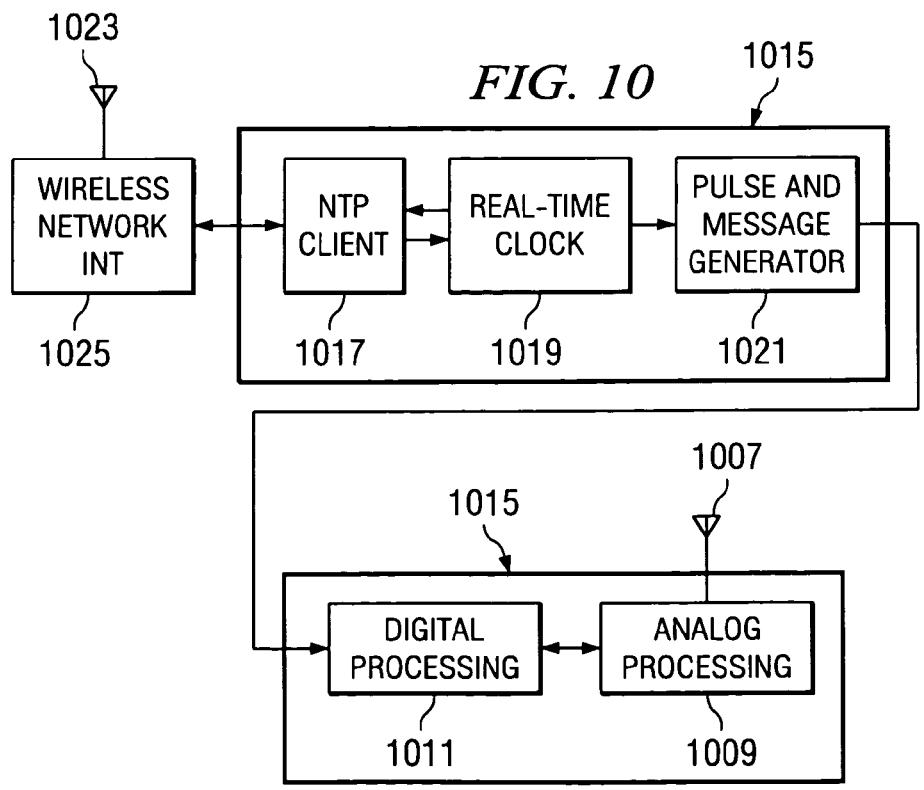
FIG. 10 is a diagram illustrating an enhanced SPS receiver with a built-in communications processor and a wireless network interface, enabling wireless delivery of timing information from a secondary source, according to a preferred embodiment of the present invention.

With reference now to FIG. 10, there is shown a diagram illustrating high-level view of a SPS receiver 1000 with a built-in communications processor, according to a preferred embodiment of the present invention. The SPS receiver 1000, as shown in FIG. 10, includes a SPS section 1005 that can be considered as being a normal SPS receiver, a communications processor 1015, and a wireless network interface 1025.

The SPS section 1005 contains all of the normal circuitry that a normal SPS receiver would have. In fact, the SPS section 1005 would operate as a normal SPS receiver if the communications processor 1015 was, for some reason, disabled. The SPS section 1005 can be roughly broken into two sections, an analog processing unit 1009 and a digital processing unit 1011. The analog processing unit 1009 performs functions such as filtering and amplifying an analog SPS signal that is transmitted by SPS satellites and received by an antenna 1007. The digital processing unit 1011 performs functions such as signal acquisition, correlation, and decoding. Not shown, but present is an analog-to-digital converter positioned between the analog and digital processing units that is used to convert the analog signal into a digital data stream.

The communications processor 1015 is as described earlier, with a NTP client 1017, a real-time clock 1019, and a pulse and message generator 1021. When operating in unison, the NTP client 1017, real-time clock 1019, and pulse and message generator 1021 can provide accurate timing information to the SPS section 1005 to help the SPS section 1005 acquire the transmissions of the SPS satellite.

FIG. 10 also displays a wireless network interface 1025 coupled to the communications processor 1015. The wireless network interface 1025 performs any and all necessary translations of electrical signals produced by the communications processor 1015 into wireless signals that are compliant with a wireless communications network being used to provide connectivity to a time server (not shown). Alternatively, the wireless network interface 1025 can be replaced with a wired network interface should a wired network connection be desired.

Figure 11A:
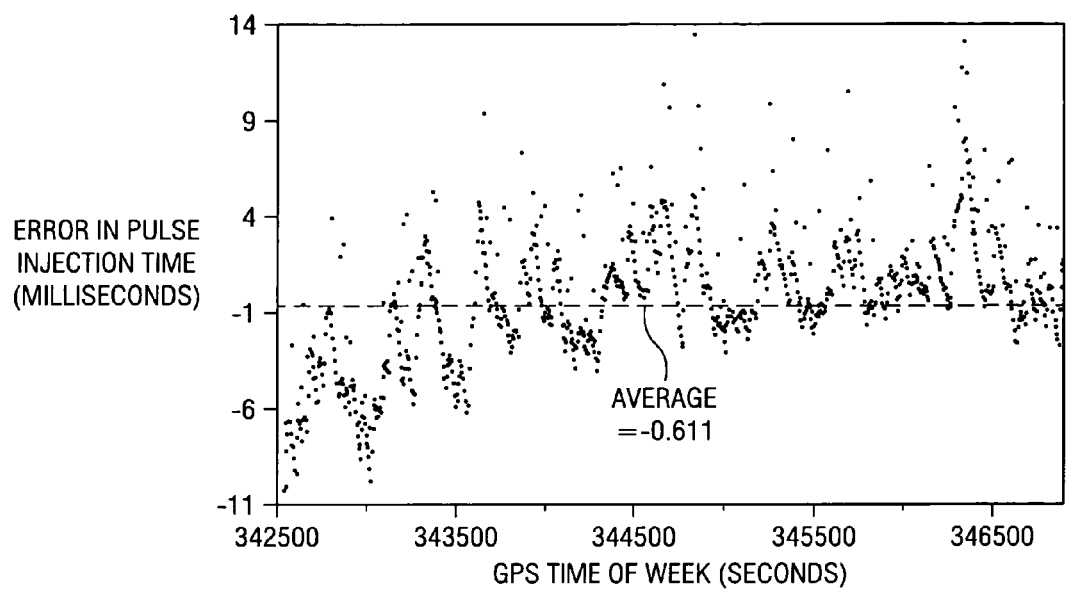
FIGS. 11a and 11b are data plots of simulations illustrating an error between time information derived using a preferred embodiment of the present invention and actual GPS system time, according to a preferred embodiment of the present invention.
Figure 11B:
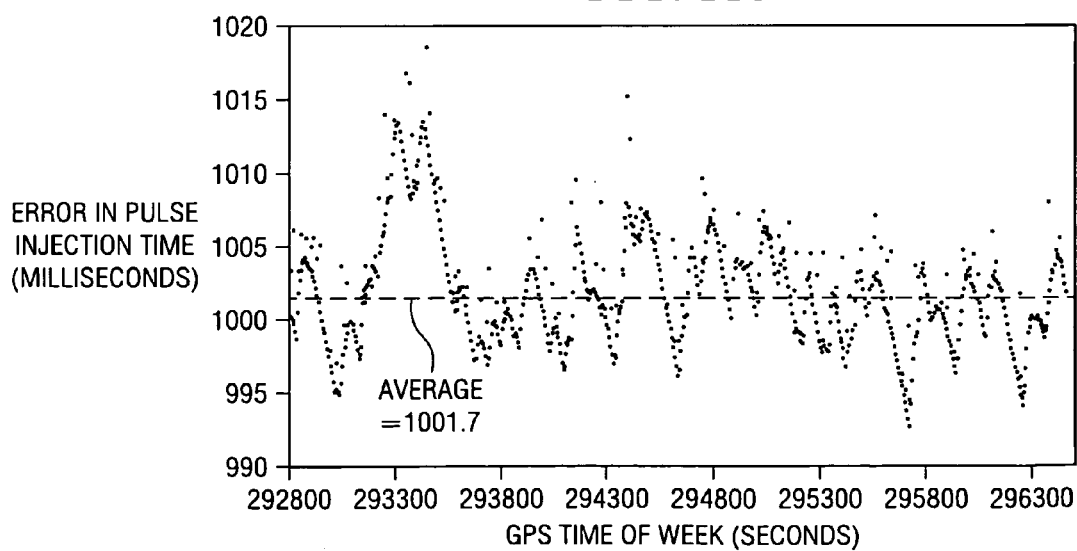

With reference now to FIGS. 11a and 11b, there are shown two data plots illustrating an error between timing information derived from a preferred embodiment of the present invention and GPS system time, according to a preferred embodiment of the present invention. The data plots show examples of the accuracy of the PMG. The data plots were derived as follows: when a GPS receiver has acquired a signal from a sufficient number of GPS satellites and is continuously tracking them, the GPS receiver knows the GPS system time to a microsecond level of accuracy. When this occurs, the GPS receiver can record the GPS system time at which the leading edge of a timing pulse from the PMG arrives (the leading edge is referred to as the injection time). The error is then the difference between the injection time and the GPS system time.

FIG. 11a illustrates the error without any deliberate error injected into the timing information derived from a preferred embodiment of the present invention, while FIG. 11b illustrates the error with an extra second of error added to the timing information derived from a preferred embodiment of the present invention. The errors in injection time exhibit averages and standard deviations in the millisecond range, with or without the intentionally added second of error. For example, with no intentionally added error, the average of the error was −0.611 milliseconds and the standard deviation of the error was 3 milliseconds, while with an intentionally added one second of error, the average of the error was 1.0017 seconds and the standard deviation of the error was 3.7 milliseconds. Note that the average error of the data plot displayed in FIG. 11b is due mainly to the one second error that was purposely injected.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for aiding signal acquisition in a satellite positioning system (SPS) comprising:

an SPS receiver, the SPS receiver containing circuitry to receive transmissions from a plurality of SPS satellites and compute, from the received transmissions, its current position and the current SPS Time;

a communications processor coupled to the SPS receiver, the communications processor containing circuitry to obtain time information from a communications network wherein the time-of-day information is from a source other than the satellite position system (SPS) and to provide the time information to the SPS receiver, wherein the communications processor comprises:

a time server client coupled to the first communications network, the time server client containing circuitry to interface with the time server;

a real-time clock coupled to the time server client, the real-time clock to maintain a time as provided by the time server; and a pulse and message generator (PMG) coupled to the real-time clock, the PMG containing circuitry to provide time information taken from the real-time clock to the SPS receiver;

a first communications network coupled to the communications processor; and a time server coupled to the first communications network, the time server containing circuitry to maintain accurate time and to response to time queries.

2. The system of claim 1, wherein the real-time clock periodically provides the time to the PMG, and the system further comprises an additional clock coupled to the real-time clock, the additional clock to provide one of a series of periodic beacon pulses and a series of time messages that are used by the PMG to ensure the accuracy of the given period.

3. The system of claim 2, wherein the additional clock is a clock built into the SPS receiver that supplies one periodic beacon pulse at the beginning of each second of SPS Time, as computed by the SPS receiver.

4. The system of claim 1, wherein the additional clock is a clock built into the SPS receiver that supplies, after each pulse sent by the PMG to the SPS receiver, a set of time messages.

5. The system of claim 4, wherein the time messages specify:

the SPS receiver's local clock time at which it received the PMG pulse, the latest SPS Time computed by the SPS receiver, and the SPS receiver local clock time exactly matching that SPS time.

6. A position measuring device comprising:

a satellite positioning system (SPS) receiver comprising an analog processing unit containing circuitry to filter and amplify an analog SPS signal received via an antenna;

a digital processing unit coupled to the analog processing unit, the digital processing unit containing circuitry to perform signal acquisition, correlation, decode, and calculation of position and SPS Time;

a communications processor comprising a pulse and message generator (PMG) unit containing circuitry to produce a timing beacon and a timing message;

a real-time clock coupled to the PMG unit, the real-time clock containing circuitry to keep track of time and to generate signals to indicate timing events; and a network client coupled to the real-time clock, the network client containing circuitry to receive timing information from a time server coupled to the communications processor via a network and to provide time adjustments to the real-time clock.

7. The position measuring device of claim 6, wherein the PMG unit further comprises a second clock input, and wherein the second clock input provides at least one of timing signals and messages from another clock.

8. The position measuring device of claim 7 further comprising a second clock coupled to the second clock input, the second clock to provide at least one of a continuous stream of periodic beacons and a stream of time messages.

9. The position measuring device of claim 8, wherein the second clock is part of the SPS receiver and supplies one periodic beacon pulse at the beginning of each second of SPS Time, as computed by the SPS receiver.

10. The position measuring device of claim 9, wherein the second clock is part of the SPS receiver and supplies, after each pulse sent by the PMG to the SPS receiver, a set of time messages specifying:
the SPS receiver's local clock time at which it received the PMG pulse,
the latest SPS Time computed by the SPS receiver, and
the SPS receiver local clock time exactly matching that SPS time.

11. The electronic apparatus of claim 1, wherein the communications network is the Internet.

12. The electronic apparatus of claim 1, wherein the communications network is a synchronous network.

13. The electronic apparatus of claim 1, wherein the communications network is an asynchronous network.

14. The electronic apparatus of claim 1, wherein the source of the time-of-day information is not part of the communications network.

15. The electronic apparatus of claim 1, wherein the source of the time-of-day information is a publicly available server.

16. The electronic apparatus of claim 15, wherein the publicly available server is a network time protocol (NTP) server.

17. The electronic apparatus of claim 15, wherein the publicly available server is a plurality of network time protocol (NTP) servers.

18. The position measuring device of claim 6, wherein the network is the Internet.

19. The position measuring device of claim 6, wherein the network is a synchronous network.

20. The position measuring device of claim 6, wherein the network is an asynchronous network.

21. The position measuring device of claim 6, wherein the source of the timing information is not part of the network.

22. The position measuring device of claim 6, wherein the source of the timing information is a publicly available server.

23. The position measuring device of claim 22, wherein the publicly available server is a network time protocol (NTP) server.

24. The position measuring device of claim 22, wherein the publicly available server is a plurality of network time protocol (NTP) servers.

* * * * *